United States Patent [19]

Slaughter et al.

[11] 4,387,920
[45] Jun. 14, 1983

[54] CELLULAR ENERGY ABSORBING BUMPER AND LAMP ASSEMBLY MOUNTED THERETO

[75] Inventors: Ronald W. Slaughter, Pendleton; David L. Carpenter, Anderson, both of Ind.

[73] Assignee: General Motors Corporation, Detroit, Mich.

[21] Appl. No.: 260,882

[22] Filed: May 6, 1981

[51] Int. Cl.³ .............................................. B60R 19/08
[52] U.S. Cl. .................................. 293/117; 293/136; 362/82
[58] Field of Search ............... 293/120, 121, 117, 122, 293/134, 135, 136, 137, 149, 150, 151, 152; 362/82

[56] References Cited

U.S. PATENT DOCUMENTS

| | | | |
|---|---|---|---|
| 3,869,164 | 3/1975 | Schmenk | 293/134 |
| 3,869,165 | 3/1975 | Miller | 293/134 |
| 3,926,463 | 12/1975 | Landwehr | 293/136 |
| 4,070,051 | 1/1978 | Peter | 293/134 |
| 4,213,644 | 7/1980 | Scrivo et al. | 293/117 |
| 4,270,787 | 6/1981 | Savell | 293/121 |

Primary Examiner—Robert R. Song
Attorney, Agent, or Firm—Charles R. White

[57] ABSTRACT

A lamp assembly is yieldably supported to the cellular energy absorbing media of resilient plastic material of a vehicle bumper by live hinges which permit lamp displacement on bumper impact to reduce or eliminate lamp assembly damage.

5 Claims, 3 Drawing Figures

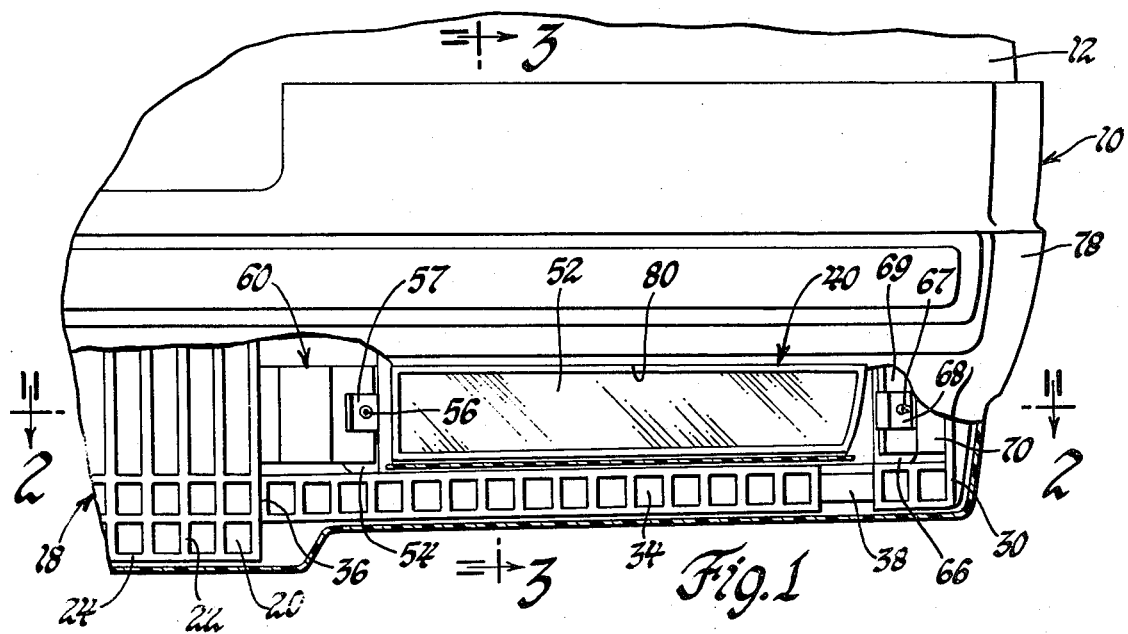
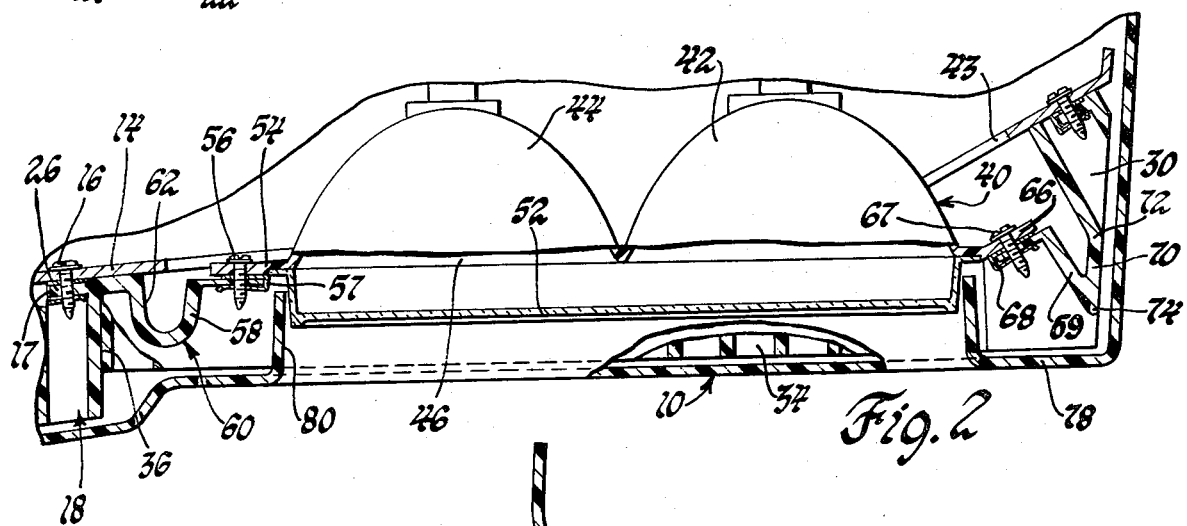
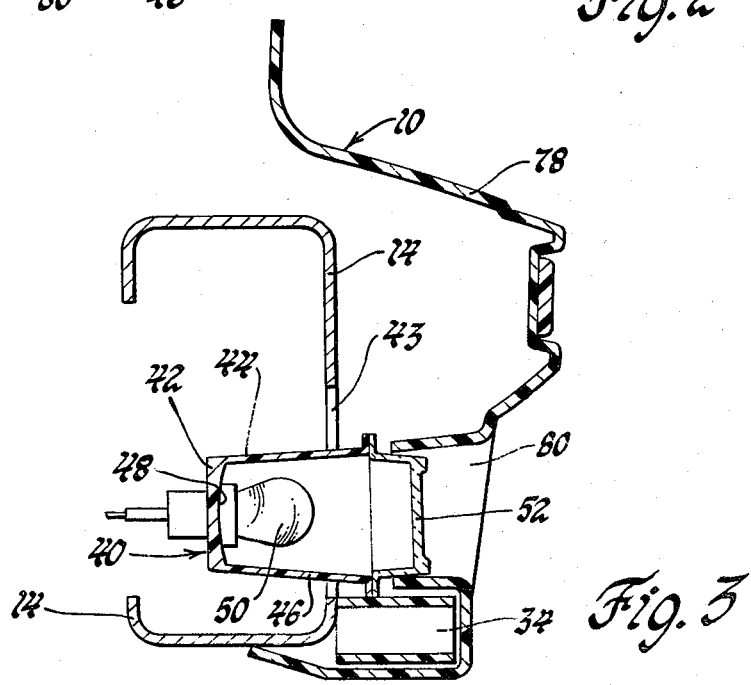

CELLULAR ENERGY ABSORBING BUMPER AND LAMP ASSEMBLY MOUNTED THERETO

This invention relates to vehicle bumpers and more particularly to a new and improved resilient energy absorbing bumper incorporating a lamp assembly coupled to energy absorbing media of the bumper by live hinge structure that permits lamp assembly displacement in response to bumper impact so that damage to the lamp assembly is reduced or eliminated.

Prior to the present invention, parking and signal lamp assemblies have been mounted within steel bumpers of vehicles and have been effectively protected during bumper impact by the surrounding metal of the bumper. In preliminary work on this invention, such lamp assemblies were mounted directly to the cells of resilient impact bumpers, such as to be multicelled energy absorbing media of a blended olefin material disclosed in U.S. Pat. No. 3,926,463, issued Dec. 16, 1975 to Landwehr et al. When these bumpers were impacted, damage to the lamp assembly and its connection to the cellular energy absorbing media of the bumper frequently occurred. For example, in corner impact situations, a lamp assembly mounted to such media may be moved longitudinally and laterally with the deflecting media. Under such conditions the lamp may receive and be damaged by a direct impact or the media and lamp mounting may be crowded into the lens or lamp housing causing fracture thereof so that the lamp assembly is damaged or destroyed. To eliminate such damage or destruction, this invention concerns a new and improved flexible mounting for coupling such lamp assemblies to cellular energy absorbing media of the bumper close to the outer surface thereof. The mounting of this invention allows the lamp assembly to be turned, twisted or otherwise displaced from its original position to infinitely variable terminal positions on impacts without damage and subsequently to be returned to its original position after impact at a predetermined rate of recovery as determined by the recovery rate of the cellular energy absorbing media. Under most conditions with this invention, the lamp assembly will not separate from its mounting to the energy absorbing media as a result of impact and importantly the lamp assembly will remain functional.

The present invention provides a new and improved energy absorbing bumper which incorporates a lamp assembly secured to the resilient energy absorbing media of the bumper by spaced attachment legs of live hinge means which permits a wide range of movement of the lamp assembly on frontal or corner impact of the bumper without damage to the lamp.

In the preferred embodiment of the invention, the cellular energy absorbing media of the bumper assembly is provided with special live hinges that have spaced legs interconnected in a U or V shape formation that movably secure the lamp assembly directly to the energy absorbing media to fully accommodate the movement, including the lateral and rearward movement to which the lamp is subjected during corner impact of the bumper.

With this invention, the lamp assembly is returned by the mounting media recovering from deflection to its original pre-impact position at a predetermined and preferably slow recovery rate as determined by material from which the media is formed. Accordingly, the lamp is displaced so that it remains spaced from the media and is returned to its original position on removal of the impact load without damage.

An object, feature and advantage of this invention is to provide a new and improved cellular energy absorbing media of a vehicle bumper provided with looped live hinge construction integral with the media which suspends and mounts a fragile lamp assembly direct to the media which not only provides for the fore and aft movement of the lamp assembly in response to frontal impact but also for compound lateral and rearward movement of the lamp assembly on corner impact.

These and other features, objects and advantages of this invention would be more apparent from the following detailed description and drawing in which:

FIG. 1 is a portion of a front elevational view of a bumper assembly in which a parking and signal lamp assembly is mounted;

FIG. 2 is a sectional view taken along lines 2—2 of FIG. 1 as viewed in the direction of the indicator arrows; and FIG. 3 is a sectional view taken along lines 3—3 of FIG. 1 as viewed in the direction of the indicator arrows.

Turning now in greater detail to the drawing, there is partially shown in FIG. 1 an energy absorbing bumper assembly 10 operatively mounted across one end of a vehicle 3 to protect body work 12 and other vehicle components. This bumper assembly comprises a laterally extending bumper beam 14 rather rigid and secured to the side rails of the vehicle frame or other vehicle components not shown. Mounted to the bumper beam 14 by suitable fasteners 16 is a multicelled energy absorbing media 18 of a suitable olefin material which is flexible and has good memory for recovery such as described in the above referenced patent to Landwehr et al U.S. Pat. No. 3,926,463.

More specifically, the media 18 has a main or frontal section comprising a plurality of longitudinally extending rectilinear cells 20 formed by intersecting longitudinally and laterally extending walls 22 and 24. Some of the cells have rear attachment walls 26 having openings therein that receive the shanks of the threaded fasteners 16 which extend through the bumper beam 14. Suitable fastening means such as spring clips 17 are installed on the free ends of shanks of the fasteners to complete the attachment of the media to the bumper beam.

In addition to the main or frontal portion, the media 18 incorporates at the outboard ends thereof, corner sections comprising cells 30 inclined at an angle with respect to cells 20 to receive and dissipate the energy of an angularly directed corner impact load. The corner and frontal sections of the media are interconnected by an intermediate section comprising a laterally extending row of rectilinear cells 34 which are similar to cells 20 and extend longitudinally of the vehicle for receiving and dissipating impact loads experienced by the bumper. The inboard end of the intermediate portion of the media can be integral with or connected to the adjacent wall of the frontal section by any suitable fastening such as by plastic heat welding at 36. The corner section of the media is connected to the outboard end of the intermediate section by a flexible hinge 38 whereby the end portion of the media can be swivelled for end abutment and attachment to the angled end portion of the bumper beam. Such mounting and construction of the energy absorbing media ensures the optimized alignment of the cells of the end section with usual corner impact loads for more effective dissipation of impact energy.

The frontal, intermediate and corner sections of the media cooperate to form a pocket into which a laterally extending park and signal lamp assembly 40 is mounted. This assembly comprises a hard and somewhat brittle plastic housing 42 which extends rearwardly through an opening 43 in the bumper beam 14. The housing 42 has flat top and bottom walls 44, 46 interconnected by a back side whose parabolic inner surface 48 is silvered to reflect and direct light rays eminating from the electrically energized bulb 50 mounted within the housing through a conventional acrylic lens 52 plastic welded to the outward side of the housing. Alternatively, a suitable direct filament lamp design may be readily utilized instead of lamp assembly 40. The inboard end of the housing of the lamp assembly has a flange 54 secured by threaded fasteners 56 and suitable fastening means such as spring clips 57 to an end portion of one arm 58 of a live hinge 60. In addition to arm 58, the hinge has an adjacent spaced arm 62 interconnected therewith at the forward end to form, in this instance, a U-shaped configuration. The arm 62 is secured to the energy absorber so that the hinge provides for yieldable longitudinal and lateral support of the lamp assembly for a wide range of lamp assembly movements, including longitudinal and lateral movements which would be experienced on corner impact. Live hinge 60 is preferably of the same material of the energy absorbing media and is integral therewith.

FIG. 2 further shows the outboard end of the lamp housing formed with a flange 66 secured by threaded fastener 67 and suitable fastening means such as spring clip 68 to an arm 69 of a second live hinge 70 formed of the media material and integrally with the corner section of the media. More particularly, the hinge 70 has a second arm 72 extending outwardly from one of the walls of cell 30 that is connected to arm 69 at an apex 74. This hinge is generally V-shaped in cross-section and functions in a manner similar to that described in connection with hinge 60. The two hinges yieldably suspend the lamp assembly in a somewhat nested position within and directly to the energy absorbing media of the bumper assembly. A flexible plastic facia 78, covering the energy absorbing media and formed with openings 80 to accommodate the lamp assembly, is attached by suitable fasteners, not shown, to the vehicle body to provide a finely finished appearance.

On corner impact, the energy absorbing media and lamp housing will be subjected to a lateral component of input force. The spaced legs of the live hinge accommodate this movement by a closing movement so that the lamp housing is displaced laterally as well as longitudinally and the mounting structures, including the hinges, fasteners and clips, will not be moved with large force into contact with the lens or the lamp housing so that fracture thereof is obviated. In addition to accommodating the above described lamp movement from corner impacts, the live hinge construction allows turning, twisting, and fore and aft lamp displacement on frontal and other impacts so that damage to the lamp assembly and mounting is reduced or eliminated. During impact, the walls of the cells are deflected in the impact zone. On removal of the impact loads, the cells recover, preferably at a slow rate, to return the lamp assembly to its original location so that the lamp assembly can be energized as needed for signalling and parking purposes.

While a preferred embodiment of the invention has been shown and described, other modifications will become apparent to those skilled in the art. Accordingly, the scope of this invention is set forth in the following claims.

The embodiments of the invention in which an exclusive property or privilege is claimed are defined as follows:

1. A bumper assembly for a wheeled vehicle comprising energy absorbing media having at least two laterally spaced sections and each section having a plurality of walls of a resilient plastic material that cooperate to form a plurality of cells of a predetermined depth for deflecting and dissipating impact loads applied thereto, said sections being separated from one another to provide a spacing of predetermined dimension therebetween, a frangible lamp assembly adapted to be mounted within said space and directly to said sections of said media, first live hinge means of resilient plastic material securing one end of said lamp assembly to said first section of said media, second live hinge means of resilient plastic material securing another end portion of said lamp assembly to said second section of said media, at least one of said live hinge means having spaced first and second leg portions respectively joined to said one of said sections and to said lamp assembly which close toward one another in response to an impact load directed onto said cells of at least one of said sections of said media to permit the movement of said lamp assembly and thereby prevent portions of said media from contacting and damaging said lamp assembly.

2. A bumper assembly extending across one end of a vehicle comprising an energy absorbing media having at least two laterally spaced sections each of which has a plurality of intersecting walls of a resilient plastic material to thereby form a plurality of open cells, a first of said sections providing a corner portion of said bumper, a second of said sections forming an inboard portion of said bumper, said sections being laterally separated from one another to provide a space of predetermined dimension therebetween, a frangible lamp assembly having a housing and an outer lens, said lamp assembly extending between said sections and disposed in said space between said sections, first live hinge means securing one end of said lamp assembly to said first of said sections, second live hinge means securing the other end of said lamp assembly to the second of said sections, said first live hinge means having first and second leg portions which close in response to a load directed onto the cells of at least one of said sections of said media to permit resulting lateral movement of said lamp assembly so that portions of said sections of said media will be prevented from contacting and fracturing said lamp assembly.

3. In a bumper for a vehicle, an elongated bumper beam adapted to be secured to one end of vehicle, an energy absorbing media having at least two laterally spaced sections mounted on said bumper beam and extending outwardly therefrom and spaced from one another to form a recess for a lamp assembly, each said section having a plurality of flattened intersecting walls formed from a resilient plastic material that cooperates to provide a plurality of open cells of a predetermined depth, a frangible lamp assembly positioned in said space and laterally extending from one of said sections to the other of said section media, first live hinge and connecting means securing one end of said lamp assembly to a first of said sections of said media, second live hinge and connecting means securing the other end of said lamp assembly to a second section of said energy absorbing media, said first and second live hinge means being formed from a resilient plastic material and each having first and second legs which are attached together at one end and which extend from said attachment into lateral spacing from one another, connector means respectively connecting adjacent end portions of each of said legs to said lamp assembly and to said section of said media adjacent thereto, said legs being adapted to close in response to the lateral component of a load directed onto said cells of at least one of said sections of said media to permit the lateral movement of said lamp assembly so that said lamp assembly is spaced from said sections during impact to obviate damage thereby.

4. A bumper assembly for a wheeled vehicle comprising energy absorbing media having a plurality of walls of a resilient plastic material that cooperate to form a plurality of cells of a predetermined depth for deflecting and dissipating impact loads applied thereto, said energy absorbing media containing an opening of predetermined dimension, a lamp assembly adapted to be mounted within said opening and directly to said media, first live hinge means of resilient plastic material securing one end of said lamp assembly to said media, second live hinge means of resilient plastic material securing another end portion of said lamp assembly to said media, at least one of said live hinge means having spaced first and second leg portions respectively joined to said media and to said lamp assembly which close toward one another in response to an impact load directed onto said cells of said media to permit the movement of said lamp assembly and thereby prevent portions of said media and vehicle structure from contacting and damaging said lamp assembly.

5. An impact bumper and lamp assembly for a wheeled vehicle comprising energy absorbing media having a plurality of interconnecting walls of a resilient plastic material that cooperate to form a plurality of rectilinear cells of a predetermined depth for deflecting and dissipating impact loads applied to the bumper assembly, said cells of said energy absorbing media being arranged to form a pocket of predetermined dimensions, a frangible lamp assembly including a shell like housing adapted to be mounted within said pocket and to said media, first live hinge means of resilient plastic material securing a first end of said housing of said lamp assembly to first predetermined walls of said media, second live hinge means of resilient plastic material securing a second end portion of said housing of said lamp assembly to second predetermined walls of said media, at least one of said live hinge means having spaced first and second leg portions interconnected together and having outer ends respectively joined to said media and to said lamp assembly which close toward one another in response to an impact load directed onto said cells of said media to permit movement of said lamp assembly and thereby prevent portions of said media from contacting and damaging said lamp assembly.

* * * * *